US009575976B2

(12) United States Patent
Wang et al.

(10) Patent No.: US 9,575,976 B2
(45) Date of Patent: Feb. 21, 2017

(54) METHODS AND APPARATUSES TO OPTIMIZE UPDATES IN A FILE SYSTEM BASED ON BIRTH TIME

(71) Applicant: Apple Inc., Cupertino, CA (US)

(72) Inventors: Wenguang Wang, Santa Clara, CA (US); Deric Horn, Los Gatos, CA (US); David Alexander Majnemer, San Francisco, CA (US); Owen Strain, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/489,372

(22) Filed: Sep. 17, 2014

(65) Prior Publication Data

US 2015/0006495 A1 Jan. 1, 2015

Related U.S. Application Data

(62) Division of application No. 12/648,273, filed on Dec. 28, 2009, now Pat. No. 8,849,876.

(51) Int. Cl.
*G06F 12/00* (2006.01)
*G06F 17/30* (2006.01)
*G06F 13/14* (2006.01)

(52) U.S. Cl.
CPC ......... *G06F 17/30082* (2013.01); *G06F 17/30* (2013.01); *G06F 17/3012* (2013.01); *G06F 17/30088* (2013.01); *G06F 17/30115* (2013.01)

(58) Field of Classification Search
CPC ................ G06F 17/30088; G06F 17/30; G06F 17/30011; G06F 17/3023; G06F 17/30286; G06F 17/30115; G06F 17/3012
USPC ............................ 707/E17.005, E17.01, 829, 999.202,707/E17.044, 661, E17.001, 812, 814
See application file for complete search history.

(56) References Cited

U.S. PATENT DOCUMENTS

2007/0106706 A1* 5/2007 Ahrens ............. G06F 17/30088
2007/0271242 A1* 11/2007 Lindblad ........... G06F 17/30436

* cited by examiner

*Primary Examiner* — Usmaan Saeed
*Assistant Examiner* — Cecile Vo
(74) *Attorney, Agent, or Firm* — Downey Brand LLP

(57) ABSTRACT

Methods and apparatuses that maintain birth time for a file system to optimize file update operations are described. The file system can include a plurality of snapshots or clones of data stored in one or more extents of blocks allocated in a storage device. Each extent may be associated with a time stamp according to the birth time. A request may be received from an executable using the file system to update data in a particular extent associated with a particular time stamp. In response, the current birth time in the file system and the particular time stamp may be compared to determine if the particular extent is not shared by more than one of the snapshots. If the particular time stamp is equal to the current birth time, the particular extent may be updated directly without performing an expensive operation to check whether a reference count of the particular extent is equal to one.

18 Claims, 6 Drawing Sheets

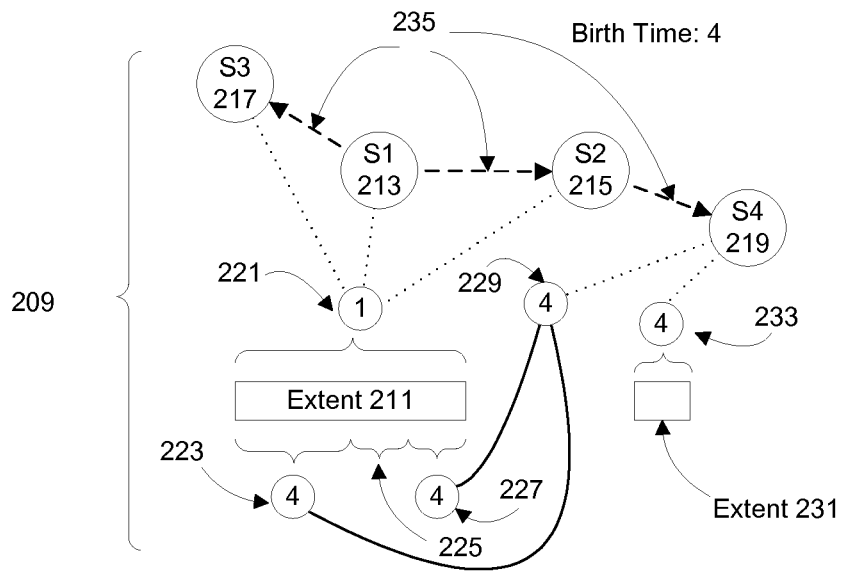
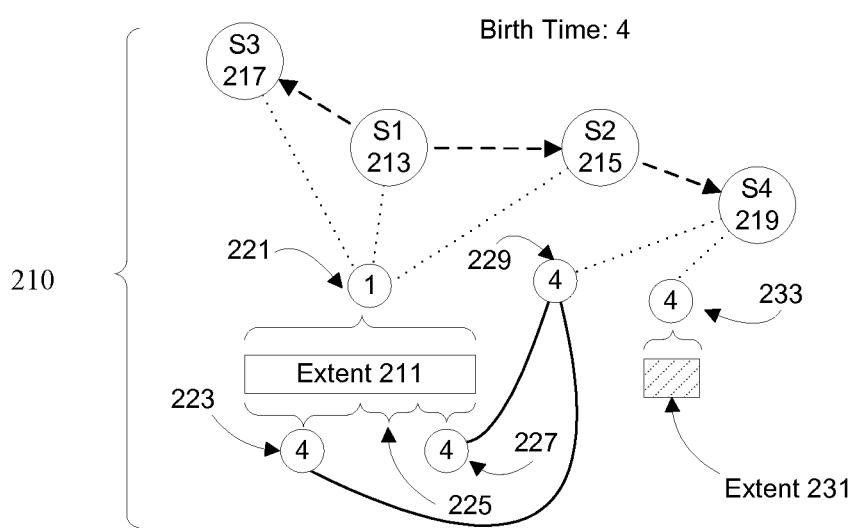
Fig. 2B

300

```
Maintaining a birth counter counting birth time for a plurality of tree structures
representing snapshots of data in the file system, each node in the tree structures
being time stamped according to the birth time when the node was created 301
```
↓
```
Maintaining a reference table storing a reference count for each node in the tree
structures and for each extent (or data extent) pointed to by the tree nodes, the
reference count indicating a number of the tree structures sharing the node 303
```
↓
```
In response to receiving a request to modify the data represented by a particular
one of the tree structures, identifying one or more nodes in the particular tree
structure to perform update operations 305
```
↓
```
Comparing, if the particular tree structure represents a clone or a file system
being updated is at a leaf of an LVF (logical volume family) clone tree, current
birth time from the birth count with a time stamp of the particular one of the
identified nodes to determine if the particular node is shared by no more than one
of the tree structures 307
```
↓
```
Performing the update operations directly (or in place) on the particular node
without accessing the reference table if the particular node is shared by no more
than one tree structure 309
```
↓
```
Traversing the reference table for performing the update operations on the
particular node based on copy-on-write strategy if the comparison does not
indicate the particular node is shared by no more than one tree structure and/or if
the particular tree structure represents a clone or a file system being updated is at
a leaf of an LVF clone tree  311
```

Fig. 3

METHODS AND APPARATUSES TO OPTIMIZE UPDATES IN A FILE SYSTEM BASED ON BIRTH TIME

CROSS-REFERENCE TO RELATED APPLICATIONS

This application is a divisional of U.S. application Ser. No. 12/648,273 filed Dec. 28, 2009, now U.S. Pat. No. 8,849,876, entitled "METHODS AND APPARATUSES TO OPTIMIZE UPDATES IN A FILE SYSTEM BASED ON BIRTH TIME," the contents of which are incorporated herein by reference in its entirety for all purposes.

FIELD

The present invention relates generally to file systems. More particularly, this invention relates to copy-on-write operations performed in file systems.

BACKGROUND

File systems are usually cloned (e.g. taking snapshots) to provide, for example, crash-recovery capabilities. A common technique employed to maintain clones or snapshots of a file system using B-Tree (Balanced Tree) structures may be based on copy-on-write operations without a need to duplicate file system data shared by multiple clones. A live file system may be called a Logical Volume. The collection of all clones of a live file system and the live file system itself may be called a Logical Volume Family. Depending on which clones are created on which clone or live file system, the clones and the live file system within the Logical Volume Family forms a tree structure, which may be called the LVF Clone Tree. The live file system is always on the leaf of the tree. If a clone is created on another clone, one of the clone is the leaf, while the other clone is not the leaf of the tree. Existing implementations of copy-on-write operations may require a costly lookup to identify reference counts for tree structures in a file system.

For example, a file system may use a reference count table to keep track of how many references there are to each tree node, e.g. representing a group of consecutive allocation blocks or extents, in tree structures of the file system. It is not uncommon for a block on disk to have hundreds of references. Typically, whether to perform copy-on-write operations for a tree node associated with blocks of data in a file system may depend on a reference count of the tree node, which may indicate how many references to the tree node currently existing in the file system.

However, B-Tree structures in a file system tend to have huge fan out. The number of links between the first and second levels in a B-Tree structure can be, for example, in the hundreds. Thus, a reference count table storing reference counts for such B-Tree structures can be too large to fit in memory. Accessing the reference count table can result in wasting system resources with frequent memory paging operations. Additionally, traversing such a large sized table to locate a reference count for a tree node may take significant amount of time to complete and have a negative impact on the performance of a file system.

Therefore, current implementations of file systems requiring reference count checking do not optimize copy-on-write strategies to share data among clones and/or live versions of the file systems.

SUMMARY

An embodiment of the present invention can include methods and apparatuses that maintain birth time for a file system to optimize file update operations. The file system can include a plurality of snapshots or clones of data stored in one or more extents of blocks allocated in a storage device. Each extent may be associated with a time stamp according to the birth time. A request may be received from an executable using the file system to update data in a particular extent associated with a particular time stamp. In response, the current birth time in the file system and the particular time stamp may be compared to determine if the particular extent is not shared by more than one of the snapshots. If the clone or the live file system is at the leaf of the LVF Clone tree, and the particular time stamp is equal to the current birth time, the particular extent may be updated directly (e.g. overwriting the data in the particular extent) without performing an expensive operation to check whether a reference count of the particular extent is equal to one. The file system can employ a copy-on-write technique if the extent cannot be updated directly.

In an alternative embodiment, a birth counter may be maintained to count birth time at creation of each dataset in a file system. A plurality of datasets may be represented by multiple tree structures in the file system. Each node in the tree structures may be time stamped according to the birth time when the node is created. A particular node may be identified to update a particular dataset without affecting other datasets based on reference counts. Whether a time stamp of the particular node can be used to skip the checking of the reference count for this node can be determined according to current birth time from the birth counter, if the clone or the live file system being updated is at the leaf of the LVF Clone Tree. The particular node can by modified in place (e.g. overwriting rather than copying on write) for the update of the particular dataset without retrieving the reference count from a data store if the reference count of the particular node equals to one. The time stamp may indicate the reference count for the particular node is one if the time stamp equals to the current birth time, and the clone or the live file system being updated is at the leaf of the LVF Clone Tree.

In another embodiment, a B-Tree structure representing a dataset in a file system may be searched based on copy-on-write strategy using reference counts for nodes in the B-Tree structure. The file system can maintain birth time to time stamp a B-Tree. The birth time may be updated upon creation of a new dataset, e.g. taking a snapshot or making a clone of the file system. When a leaf node in the B-Tree structure is traversed during the search, efficient update operations on data blocks associated with the leaf node may be enabled using a time stamp of the leaf node without expensive retrieval of a reference count of the leaf node, if the clone or the live file system being updated is at the leaf of the LVF Clone Tree. Thus, subsequent time-consuming copy-on-write operations to store data for newly created leaf nodes, updates of the data for the leaf nodes may be performed in place without retrieving reference counts of the leaf nodes to optimize data update operations in the file system.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIGS. 2A and 2B are sequence diagrams illustrating datasets in a file system updated along birth time;

FIG. 3 is a flow diagram illustrating one embodiment of a process to update snapshots of a file system with birth time;

DETAILED DESCRIPTION

Figure 1:
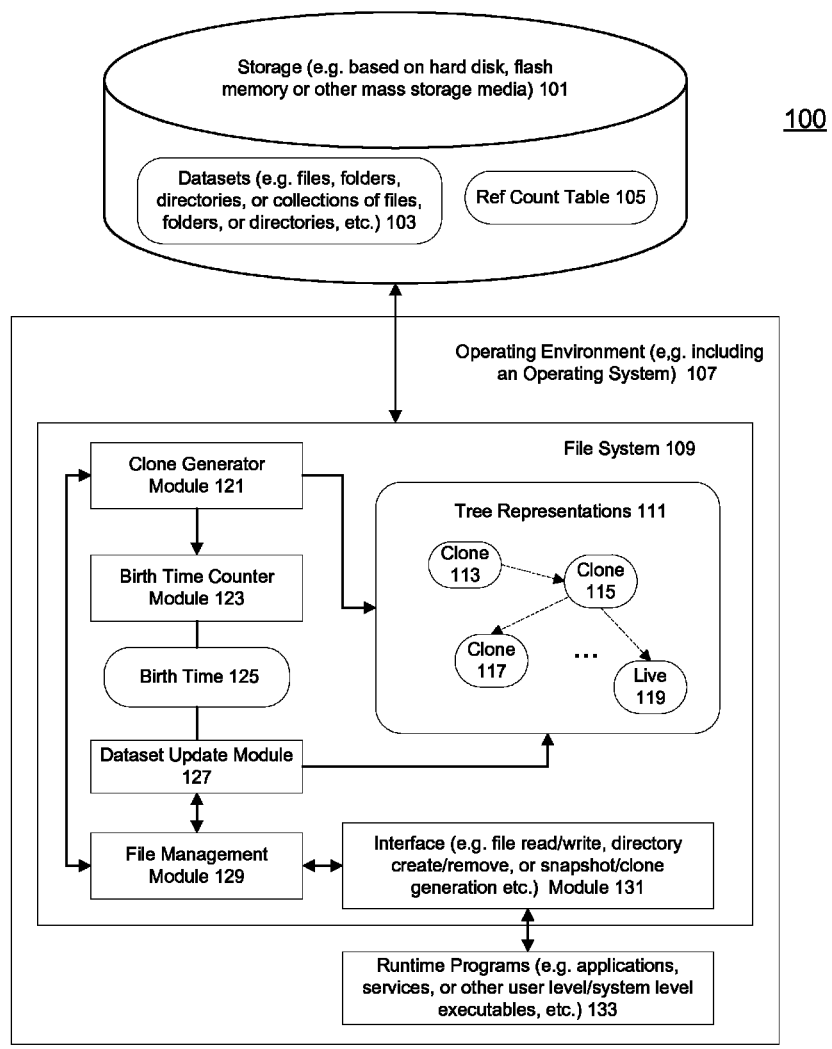
FIG. 1 is a block diagram illustrating one embodiment of a system to update a file system using birth time.

Methods and apparatuses for optimizing updates in a file system based on birth time are described herein. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

In one embodiment, birth time for a file system can be used in conjunction with reference counts to enable optimization to decide when a copy-on-write operation is needed. The birth time of an extent of blocks allocated in a storage device within a logical volume of a file system can be maintained to avoid consulting a large data structure, such as a reference count table, storing the usage of every extent of blocks for each logical volume group of the file system. In one embodiment, if the birth time of an extent matches current birth time for families of logical volumes in a file system and the file system (a clone or the live file system) is at the leaf of the LVF Clone Tree, the data in the extent can be safely overwritten without performing a copy-on-write operation. File system performance can be improved with little additional space for storing extra bitmaps by bypassing the expensive lookups to the reference count table.

In another embodiment, implementations of copy-on-write operations in a file system can be improved to yield much better performance by adopting the concept of birth time. Typical birth time can be a counter, e.g. a birth time counter, associated with each dataset, e.g. file, folder, collections of files and/or folders, or a logical volume. When a new clone or snapshot is created for a new dataset in a file system, the birth time for the file system can be incremented for the new dataset. In one embodiment, whenever an extent is created or modified for a dataset, the extent may be time stamped with the active or current birth time for the dataset. Creating new clones or snapshots of the file system can cause the birth time counter to increment.

In one embodiment, optimization to perform update operations on an extent in a file system to preserve shared data among clones or snapshots of the file system may occur when the birth time associated with the extent equals to the birth time of the file system and when the file system is at the leaf of the LVF Clone Tree. When optimized, an update operation may not need to check a reference count for the extent from a data structure storing reference counts. In one embodiment, the birth time associated with the block can indicate time of creation (of the block) per logical volume family. Birth time can be based on a counter counting a sequence of numbers instead of actual time.

For example, three datasets representing a week old clone, a day old clone and a live version of a file system can all point to a common block on disk. The live version of the file system may be at the leaf of the LVF Clone Tree. A request for the live version to update a file including the common block may be limited by preserving contents of the common blocks on disk without affecting the week old and the day old clones. A new block may be created for the live version to perform the update operation. The new block may be time stamped with current birth time of the file system or the birth time associated with the live version. Subsequent requests for the live version to update the common block for the file may be optimized with a quick check to determine if the birth time for the common block equals to the birth time of the live version. If they are equal, indicating there is no reference from the week old clone neither the day old clone, the common block is not commonly referenced, used only by the live file system, and can be overwritten in place for the live version without expensive lookup for a reference count as needed in performing copy-on-write operations.

FIG. 1 is a block diagram illustrating one embodiment of a system to update a file system using birth time. In one embodiment, system 100 may include a computer operating environment 107 having a file system 109 in an operating system. Storage 101 may be one or more storage devices, such as hard disks, flash memories or other mass storage media, locally or remotely coupled to storage 101. In one embodiment, storage 101 may store one or more datasets 103 for file system 109 in one or more blocks as basic storage allocation units. A dataset may include files, folders (or directories), attributes of files or folders, and/or collections of files or folders. For example, a dataset may correspond to a logical volume in file system 109.

In one embodiment, file system 109 may include tree representations 111 having one or more tree structures, such as clones 113, 115, 117 and live 119, to represent corresponding datasets 103. A clone may be a dataset based on a snapshot of data in file system 109 at a time instance (e.g. current time or earlier time). Live 119 can represent current data (or a snapshot of the data at the current time instance) in file system 109. A tree structure in tree representations 111 may be a B-Tree data structure associated with raw data (e.g. content of files) stored in storage 101, to allow efficient tree operations (e.g. searches, insertions, deletions, and/or sequential accesses) for updating datasets, e.g. in logarithmic amortized time. Each dataset may include at least one tree representation.

In some embodiments, tree structures in tree representations 111 may relate to each other in a dependency tree specifying cloning relationships among different snapshots of file system 109, i.e., the LVF Clone Tree. For example, clone 115 may represent a snapshot of file system 109 taken from changes made to an earlier snapshot represented by clone 113. A snapshot represented by clone 115 may have multiple child snapshots, e.g. corresponding to clone 117 and live 119 etc. A leaf snapshot may not have any child snapshot, such as represented by clone 117, live 119.

A plurality of tree structures in a file system may share common nodes for portions of the file system which are not updated among different snapshots corresponding to the tree structures. Typically, a node in a tree (or tree structure) may be referenced by one parent node in the same tree. When shared, a node may have multiple parent nodes in different trees. A reference count for a node may indicate the number of parent nodes associated with the node. In one embodiment, ref count table 105 may store a reference count for each node of every tree in tree representations 111.

In one embodiment, file system 109 may include birth time 125 storing a number, for example, indicating a sequence of time instants. Birth time counter module 123 may update or count up birth time 125 when instructed. Clone generator module 121 may notify birth time counter module 123 to update birth time 125 when generating a new snapshot (or clone) for file system 109. Birth time 125 may increase or increment with time as new snapshots are taken for file system 109. Each tree node in tree representations 111 may be time stamped according to birth time 125, for example, when the tree node is generated.

In one embodiment, dataset update module 127 can perform update operations for file system 109, such as adding/deleting files, adding/deleting folders, changing contents of files, etc. via one or more tree node operations on tree representations 111. Tree node operations may include modification of one or more tree structures, such as inserting, deleting, updating one or more nodes in the tree representations. For example, dataset update module 127 may perform copy-on-write operations on live 119 based on reference counts stored in ref count table 105. Dataset update module 127 may rely on birth time 125 to determine whether to load or traverse ref count table 105 when performing copy-on-write operations.

File system 109 may include interface module 131 to receive file system access requests from runtime programs 133, e.g. via APIs (application programming interface). File management module 129 may determine access operations, such as file/directory (or folder) access (read/write or create/remove) and/or file system snapshot (clone) generation, etc. for the received file system access requests. For example, file management module 129 may send a file access request to dataset update module 127 to update a file represented in live 119. Alternatively, file management module 129 can forward a request to clone generator module 121 to generate a new clone from an existing clone, such as clone 115 or live 119 in tree representations 111.

Figure 2A:
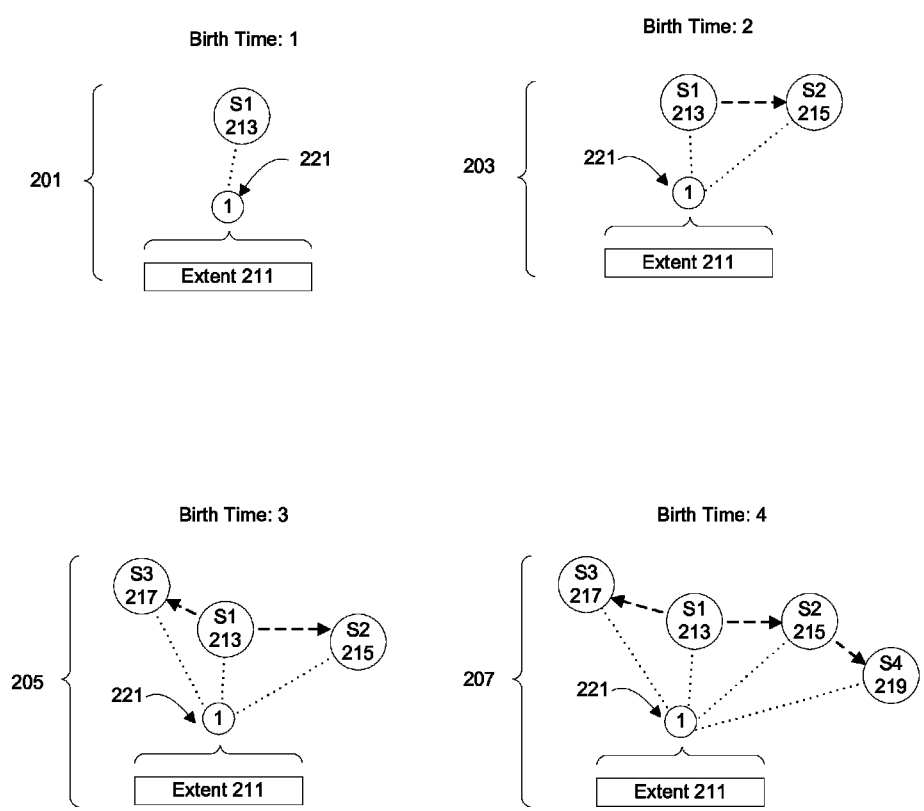

FIGS. 2A and 2B are sequence diagrams illustrating datasets in a file system updated along birth time. Example 200 may be based on an exemplary file system maintaining birth time for updating one or more trees representing snapshots of the file systems without accessing reference counts stored for tree nodes, such as in system 100 of FIG. 1. In one embodiment, at instance 201, the exemplary file system may include tree S1 213 as a tree structure representing current data (e.g. live data) in the exemplary file system, such as live 119 in FIG. 1. The exemplary file system may be associated with a birth time of value 1 at instance 201.

In one embodiment, tree S1 213 may include tree node 221 stamped with a birth time of value 1. Tree node 221 may be created for tree S1 213 at a time when birth time of the exemplary file system is of value 1. In certain embodiments, tree node 221 may be a leaf node in tree S1 213 to represent extent 211 corresponding to an extent of blocks allocated in a storage device, such as storage 101 of FIG. 1. Subsequently at instance 203, for example, tree S2 215 may have been created by cloning tree S1 213 for a live dataset in the exemplary file system with birth time advanced to 2. Tree S1 213 may be modified between instances 201 and 203. Tree node 221 may be shared by both trees S1 213 and S2 215 with a reference count equal to 2. Tree S2 215 may include one or more tree nodes not shared with tree S1 213 for changes or updates in datasets made on tree S1 213 since instance 201.

In one embodiment, at instance 205 subsequent to instance 203, additional tree S3 217 may have been cloned from tree S1 213 with birth time advanced to 3. Trees S3 217 and S±213 may have a clone relationship. Tree node 221 may be shared by all three snapshots represented by trees S1 213, S2 215 and S3 217 with a reference count equal to 3 at instance 205. Illustratively, at instance 207 subsequent to instance 205, another tree S4 219 may have been cloned from tree S2 215 with birth time advanced to 4. Tree node 221 may be shared by all trees S1 213, S2 215, S3 217 and S4 219 with a reference count equal to 4 at instance 207. Tree S4 219 may represent current data or a live dataset in the exemplary file system at instance 207. S1 213, S2 215, S3 217 and S4 219 may be related in a clone tree, such as an LVF clone tree, based on clone relationships 235 (illustrated in FIG. 2B).

Turning now to FIG. 2B, in one embodiment, at instance 209 subsequent to instance 207, updates to data stored in portion 225 of extent 211 for the current dataset in the exemplary file system represented by tree S4 219 (live tree) may have been performed, e.g. based on dataset update module 127 of FIG. 1. Consequently, in one embodiment, according to the copy-on-write strategy, extent 231 may be allocated in a storage device for the updates corresponding to portion 225 while extent 211 can be kept unchanged without affecting trees S1 213, S2 215 and S3 217.

Tree node 229 may have been created in tree S4 219 to share portions of extent 211 with trees S1 213, S2 215 and S3 217. Tree nodes 223 and 227 can be created as child nodes of tree node 229 to represent separate portions of extent 211 shared with other trees. Tree node 233 can be created to represent extent 231. In one embodiment, birth time of the exemplary file system remains to be 4 during the time period between instances 207 and 209. Thus, tree nodes 223, 227, 229 and 233 may be time stamped with birth time equal to 4. The reference count for the part of the extent pointed by node 223 and 227 are 2; the reference count for the part of the extent pointed by node 229 and 233 is 1. Tree node 221 may no longer be shared by tree S4 219 with reference count decreased from 4 to 3.

In one embodiment, at instance 210 subsequent to instance 209, data stored in extent 231 may have been updated, e.g. via dataset update module 127 according to a request from file management module 129 of FIG. 1. Birth time in the exemplary file system may remain as 4 during the time period between instances 209 and 210. Updating extent 231 may be based on an optimized copy-on-write strategy including locating node 233 in tree S4 219 and comparing time stamp (4) of node 233 with birth time (4) of the exemplary file system without retrieving a reference count for node 233.

FIG. 3 is a flow diagram illustrating one embodiment of a process to update snapshots of a file system with birth time. Exemplary process 300 may be performed by a processing logic that may comprise hardware (circuitry, dedicated logic, etc.), software (such as is run on a dedicated machine), or a combination of both. For example, process 300 may be performed by some components of system 100 of FIG. 1. At block 301, the processing logic of process 300 can maintain a birth counter, such as based on birth time counter module 123 of FIG. 1, counting birth time, such as birth time 125 of FIG. 1, for a plurality of tree structures, such as in tree representations 111 of FIG. 1, representing snapshots or clones of data in a file system. Each snapshot or clone may represent datasets in a file system at a certain point in time. For example, a snapshot of a file system may allow the file system to revert back to a state at an earlier time.

In one embodiment, the processing logic of process 300 may time stamp each node (e.g. when creating the node) in a tree structure representing a dataset in a file system according to a birth time of the file system. The processing logic of process 300 can count up the birth time of a file system for creating a snapshot or a clone of the file system. For example, the processing logic of process 300 can update the birth time and time stamp tree nodes representing a newly generated snapshot or clone for a file system.

At block 303, in one embodiment, the processing logic of process 300 can maintain a reference count table, such as ref count table 105 of FIG. 1, to store reference counts for tree nodes in tree structures representing datasets in a file system. The processing logic of process 300 can assign a reference count for each tree node to indicate a number of other tree nodes referring to the tree node, such as a parent node of the tree node.

Typically, each tree node having a parent node in a tree structure can have a reference count greater than zero. A tree node shared by multiple tree structures may have a reference count equal to the number of the sharing tree structures. The processing logic of process 300 can update a reference count for a tree node when performing update operations on the tree structures. As the size of a reference count table grows with the number of tree nodes associated, the processing logic of process 300 may load (e.g. a portion of) the reference count table from a storage device, such as storage 101 of FIG. 1, for accessing a reference count for a tree node.

At block 305, the processing logic of process 300 may receive a request to update or modify a file system, e.g. from runtime programs 133 via interface module 131 of FIG. 1, to perform update operations for the file system. In response, the processing logic of process 300 may identify one or more tree nodes for update in a tree structure, for example, representing a live dataset for the file system based on copy-on-write strategy. For example, the processing logic of process 300 may traverse a tree structure top down including checking and updating reference counts for identified nodes during the traversal.

According to one embodiment, at block 307, the processing logic of process 300 can compare current birth time of the exemplary file system with a time stamp of an identified tree node to determine if the identified tree node is not shared by more than one tree structure. This use of birth time can be performed when the file system or clone being updated is at the leaf of the LVF Clone Tree. Typically, current birth time may be readily available from the exemplary file system, such as retrieved from birth time 125 of FIG. 1. The time stamp of the identified tree node may be based on the birth time of the exemplary file system at an earlier time when the identified tree node was created.

In one embodiment, at block 309, if the current birth time of the exemplary file system equals to a time stamp of an identified tree node, the identified tree node may be shared by no more than one tree structure. The identified tree node may have a reference count equal to 1 if the identified tree node is shared by no more than one tree structure. The processing logic of process 300 can perform update operations directly or in place on the identified tree node similar to a copy-on-write strategy with a reference count equal to 1 for the identified tree node, but without actually retrieving the reference count of the identified tree node. The processing logic of process 300 can ensure a reference count equal to 1 for the identified tree node without traversing or even accessing a table (or other data structures), such as ref count table 105 of FIG. 1, storing the reference count for the identified tree node.

Otherwise, at block 311, if the file system or the clone being updated is not at the leaf of the LVF Clone Tree, or a comparison between a current birth time of the exemplary file system and a time stamp of an identified tree node does not indicate the identified tree node is shared by no more than one tree structure (e.g. the current birth time not equal to the time stamp), the processing logic of process 300 may retrieve a reference count for the identified tree node. For example, the processing logic of process 300 can load a reference count table from a storage, such as storage 101 of FIG. 1, to traverse the reference count table to locate the reference count for the identified tree node. The processing logic of process 300 may perform update operations on the identified tree node using the retrieved reference count based on copy-on-write strategy.

Figure 4:
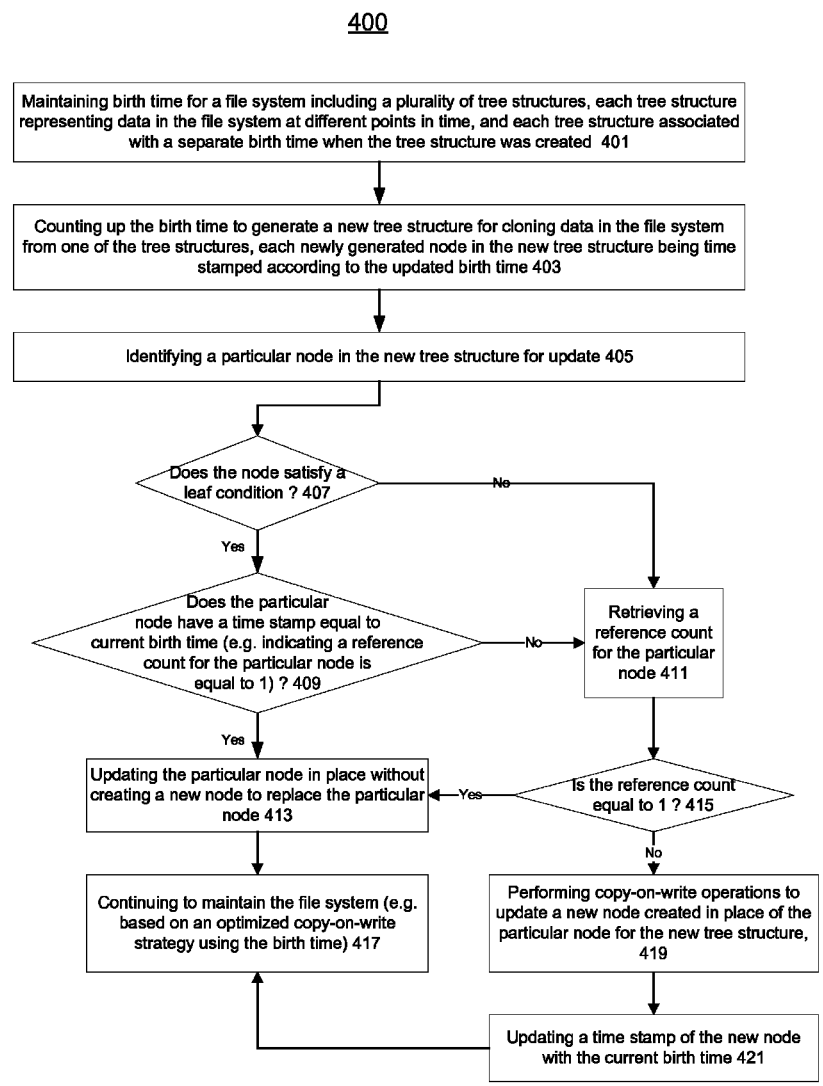
FIG. 4 is a flow diagram illustrating one embodiment of a process to optimize copy-on-write operations based on birth time in a file system.

FIG. 4 is a flow diagram illustrating one embodiment of a process to optimize copy-on-write operations based on birth time in a file system. Exemplary process 400 may be performed by a processing logic that may comprise hardware (circuitry, dedicated logic, etc.), software (such as is run on a dedicated machine), or a combination of both. For example, process 400 may be performed by some components of system 100 of FIG. 1. In one embodiment, at block 401, the processing logic of process 400 can maintain birth time for a file system, such as based on birth time counter module 123 of FIG. 1. The file system may include multiple tree structures representing data of the file system at different points in time (e.g. a history), such as in tree representations 111 of FIG. 1. One of the tree structures may correspond to live data of the file system. Each tree structure may be associated with a separate birth time, e.g. stored in a super block allocated in a storage device for the tree structure, according to the birth time of the file system at the time when the tree structure was created (e.g. when a snapshot was taken for a clone)

At block 403, in one embodiment, the processing logic of process 400 may count up birth time, e.g. based on birth time counter module 123 of FIG. 1, of a file system to generate a new tree structure for cloning data in the file system from one of existing clones or live data. For example, the processing logic of process 400 can receive a file system request to clone a live dataset of the file system, e.g. based on clone generator module 121 of FIG. 1. The new tree structure may include a newly generated root node and one or or more tree nodes shared with other tree structures according to copy-on-write strategy. In some embodiments, the new tree structure may represent the live dataset of the file system. Each newly generated node in the new tree structure may be time stamped according to the already counted up birth time.

In one embodiment, the processing logic of process 400 can update reference counts for newly generated tree nodes and shared tree nodes in the new tree structure, for example, via a table storing reference counts for tree nodes, such as ref count table 105 of FIG. 1. The processing logic of process 400 can assign reference count 1 to a newly generate tree node and count up an existing reference count for each shared node, for example, based on copy-on-write strategy.

At block 405, the processing logic of process 400 can identify a particular node in the new tree structure for update. For example, the processing logic of process 400 can receive a file update request, such as via a file management module 129 of FIG. 1, to perform update operations on live data of a file system represented by the new tree structure. The processing logic of process 400 can traverse the new tree structure from top down to identify one or more tree nodes to perform update operations according to the file update request received.

In one embodiment, at block 407, the processing logic of process 400 can determine or verify if a leaf condition is satisfied for a particular one of the tree nodes identified for update. A leaf condition for a tree node may be satisfied, for example, if the tree node belongs to a tree structure which represents a clone or a file system being updated at a leaf of a LVF clone tree and/or whether the tree node is a leaf node in the tree structure. A tree node may be a leaf node or a leaf according to whether the tree node has any child node and/or whether the tree node has been cloned or copied. In some embodiments, the tree structures may be related in an LVF clone tree, such as based on clone tree relationships 235 of FIG. 2B. A particular tree node of a particular one of the tree structure may be a leaf node if the particular tree structure is a leaf in the LVF clone tree.

If the particular node is a leaf node, at block 409, the processing logic of process 400 can compare a time stamp of the particular node and current birth time maintained for a file system. The processing logic of process 400 can determine whether the particular node is shared by more than one tree structures in the file system based on the time stamp and the current birth time. If the time stamp equals the current birth time, in one embodiment, the particular node may not be shared by more than one tree structure, which could indicate a reference count stored, e.g. in a table, such as ref count table 105 of FIG. 1, for the particular node is equal to one without retrieving the reference count.

If the particular node is referenced in only one tree structure (i.e. shared by no more than one tree structures), at block 413, the processing logic of process 400 can perform update operations in place or directly on the particular node. For example, the process logic of process 400 can locate one of child nodes of the particular node to perform update operations. Alternatively, the processing logic of process 400 can update data represented by the particular node corresponding to blocks allocated in a storage device, such as storage 101 of FIG. 1, without updating a reference count of the particular node.

At block 417, the processing logic of process 400 may continue to maintain a file system, for example, based on an optimized copy-on-write strategy using birth time. The processing logic of process 400 may proceed to update additional identified tree nodes to complete request update operations using the birth time according to copy-on-write strategy. Alternatively, the processing logic of process may receive additional file management requests for maintaining the file system.

At block 411, in one embodiment, if whether the particular node is shared or not cannot be determined, the processing logic of process 400 may retrieve a reference count for the particular node from a reference count store, such as ref count table 105 of FIG. 1. Typically, locating the reference count for the particular node from the reference count store may require expensive traversal. When limited in available memory space, the processing logic of process 400 may perform memory paging operations to load portions of the reference count store to retrieve the reference count for the particular node.

At block 415, in one embodiment, the processing logic of process 400 can determine if the particular node is shared by more than one tree structure, e.g. representing more than one clone of a file system, based on whether a retrieved reference count for the particular node is equal to 1. If the particular node is not shared, the processing logic of process 400 can proceed to perform update operations at block 413. Alternatively, at block 419, if the particular node is shared according to a retrieved reference count of the particular node, the processing logic of process 400 can perform copy-on-write operations to update the particular node.

For example, the processing logic of process 400 can generate a new tree node to replace the particular node in a tree structure representing live data of a file system. The processing logic of process 400 may update a reference count store to increase reference counts for child nodes of the particular node by one. In some embodiments, the processing logic of process 400 can update the reference count store to decrease the reference count of the particular node by one. Alternatively, the processing logic of process 400 can allocate one or more blocks in a storage device for the new tree node to store data based on copy-on-write operations. At block 421, the processing logic of process 400 can update a time stamp of the new tree node with current birth time of the file system. The processing logic of process 400 may continue at block 417.

Figure 5:
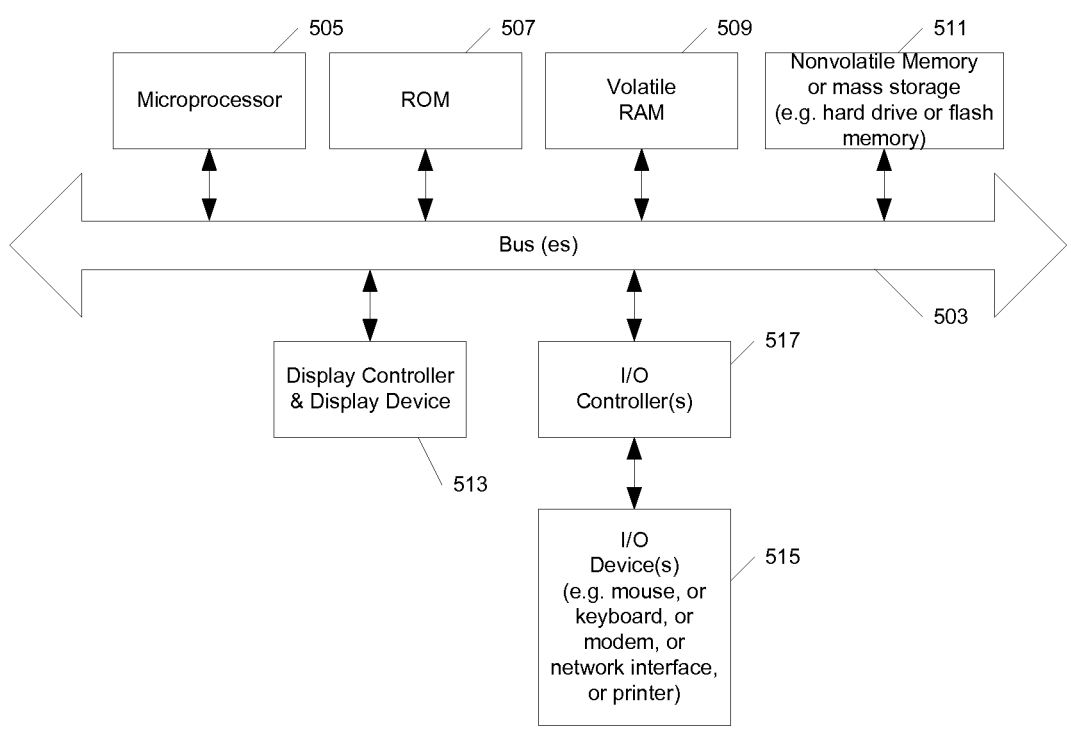
FIG. 5 illustrates one example of a data processing system such as a computer system, which may be used in conjunction with the embodiments described herein.

FIG. 5 shows one example of another data processing system such as a computer system, which may be used with one embodiment the present invention. For example, the system 500 may be implemented as a part of the system shown in FIG. 1. Note that while FIG. 5 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 5, the computer system 500, which is a form of a data processing system, includes a bus 503 which is coupled to a microprocessor(s) 505 and a ROM (Read Only Memory) 507 and volatile RAM 509 and a non-volatile memory 511. The microprocessor 505 may retrieve the instructions from the memories 507, 509, 511 and execute the instructions to perform operations described above. The bus 503 interconnects these various components together and also interconnects these components 505, 507, 509, and 511 to a display controller and display device 513 and to peripheral devices such as input/output (I/O) devices which may be mice, keyboards, modems, network interfaces, printers and other devices which are well known in the art. Typically, the input/output devices 515 are coupled to the system through input/output controllers 517. The volatile RAM (Random Access Memory) 509 is typically implemented as dynamic RAM (DRAM) which requires power continually in order to refresh or maintain the data in the memory.

The mass storage 511 is typically a magnetic hard drive or a magnetic optical drive or an optical drive or a DVD RAM or a flash memory or other types of memory systems which maintain data (e.g. large amounts of data) even after power is removed from the system. Typically, the mass storage 511 will also be a random access memory although this is not required. While FIG. 5 shows that the mass storage 511 is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface or wireless networking interface. The bus 503 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method for implementing a file system, the method comprising:
  maintaining a birth counter for the file system, wherein:
    the file system comprises a plurality of datasets arranged in a clone tree structure,
    each dataset of the plurality of datasets is represented by a respective tree structure having one or more nodes, and
    the birth counter is updated when a new dataset is added to the plurality of datasets;
  identifying a particular node of the one or more nodes to update a particular dataset of the plurality of datasets; and
  in response to (1) determining that the respective tree structure of the particular node is positioned as a leaf within the clone and has at least one parent tree structure and no child tree structures, and (2) determining that a time stamp of the particular node equals a current birth time from the birth counter, wherein the time stamp of the particular node is associated with a time at which the particular node was created:
    modifying the particular node in-place to update the particular dataset without retrieving a reference count for the particular node, wherein the reference count is associated with a number of other nodes related to the particular node.

2. The method of claim 1, wherein the reference count has a value of one when the time stamp of the particular node equals the current birth time.

3. The method of claim 2, wherein, when the reference count for the particular node equals one, the particular node is referenced by one other node.

4. The method of claim 1, wherein the plurality of datasets include a first dataset and a second dataset having a clone relationship, the second dataset is cloned from the first dataset, and the second dataset is positioned as a leaf within the clone tree structure.

5. The method of claim 4, wherein the first dataset is positioned as a parent to the second dataset within the clone tree structure.

6. The method of claim 1, wherein a data structure is stored in a storage device, and retrieving the reference count comprises:
    loading the data structure from the storage device; and
    searching within the data structure for the reference count for the particular node.

7. The method of claim 6, further comprising:
    perform copy-on-write operations on the particular node in accordance with the reference count.

8. The method of claim 1, wherein the number of other nodes associated with the particular node includes at least a parent node of a tree node.

9. The method of claim 1, wherein the reference count for the particular node is maintained in a reference count table.

10. The method of claim 9, wherein a size of the reference count table increases with an increase in the number of other nodes that are associated with the particular node.

11. A computing device, comprising:
    at least one memory storing executable instructions for implementing a file system at the computing device; and
    at least one processor coupled to the at least one memory and configured to execute instructions from the at least one memory that cause the at least one processor to carry out steps that include:
        maintaining a birth counter for the file system, wherein:
            the file system comprises a plurality of datasets arranged in a clone tree structure,
            each dataset of the plurality of datasets is represented by a respective tree structure having one or more nodes, and
            the birth counter is updated when a new dataset is added to the plurality of datasets;
        identifying a particular node of the one or more nodes to update a particular dataset of the plurality of datasets;
        in response to (1) determining that the respective tree structure of the particular node is positioned as a leaf within the clone and has at least one parent tree structure and no child tree structures, and (2) determining that a time stamp of the particular node equals a current birth time from the birth counter, wherein the time stamp of the particular node is associated with a time at which the particular node was created:
            modifying the particular node in-place to update the particular dataset without retrieving a reference count for the particular node, wherein the reference count is associated with a number of other nodes related to the particular node.

12. The computing device of claim 11, wherein a reference count equal to one is provided when the time stamp of the particular node equals the current birth time.

13. The computing device of claim 11, wherein a data structure is stored in a storage device coupled to the computing device, and the steps further include:
    loading the data structure from the storage device; and
    searching the data structure for the reference count for the particular node.

14. The computing device of claim 11, wherein the steps further include:
    performing copy-on-write operations on the particular node according to the reference count.

15. The computing device of claim 11, wherein the steps further include:
    identifying the one or more nodes in the plurality of datasets upon receiving a request to perform an update on the file system.

16. The computing device of claim 11, wherein the steps further include:
    maintaining the reference count for the particular node in a reference count table.

17. At least one machine-readable non-transitory storage medium having computer-executable instructions that, when executed by at least one processor included in a computing device, cause the computing device to carry out steps that include:
    maintaining a birth counter for a file system, wherein:
        the file system comprises a plurality of datasets arranged in a clone tree structure,
        each dataset of the plurality of datasets is represented by a respective tree structure having one or more nodes, and
        the birth counter is updated when a new dataset is added to the plurality of datasets;
    identifying a particular node of the one or more nodes to update a particular dataset of the plurality of datasets;
    in response to (1) determining that the respective tree structure of the particular node is positioned as a leaf within the clone and has at least one parent tree structure and no child tree structures, and (2) determining that a time stamp of the particular node equals a current birth time from the birth counter, wherein the time stamp of the particular node is associated with a time at which the particular node was created:
        modifying the particular node in-place to update the particular dataset without retrieving a reference count for the particular node, wherein the reference count is associated with a number of other nodes related to the particular node.

18. The at least one machine-readable non-transitory storage medium of claim 17, wherein the steps further include:
    maintaining the reference count for the particular node in a reference count table.

* * * * *